United States Patent
Tung et al.

[11] Patent Number: 5,290,830
[45] Date of Patent: Mar. 1, 1994

[54] RETICULATED BACTERIAL CELLULOSE REINFORCEMENT FOR ELASTOMERS

[75] Inventors: William C. Tung; Deborah A. Tung, both of Tallmadge; Douglas D. Callander, Akron; Richard G. Bauer, Kent, all of Ohio

[73] Assignee: The Goodyear Tire and Rubber Company, Akron, Ohio

[21] Appl. No.: 788,663

[22] Filed: Nov. 6, 1991

[51] Int. Cl.$^5$ ............................ C08L 1/00; C08L 1/02
[52] U.S. Cl. ........................................ 524/35; 524/36; 524/572; 526/335; 428/297; 162/13; 162/150; 162/157.6
[58] Field of Search ............... 524/36, 572, 35; 526/335; 428/297; 162/150, 13, 157.6

[56] References Cited

U.S. PATENT DOCUMENTS

| | | | |
|---|---|---|---|
| 1,098,882 | 1/1913 | Collardon | 524/36 |
| 1,128,851 | 2/1915 | Collardon | 524/36 |
| 2,291,700 | 8/1942 | Dreyfus | 524/36 |
| 3,645,940 | 2/1972 | Stephens et al. | 524/36 |
| 3,928,291 | 12/1975 | Sanda | 526/335 |
| 3,969,568 | 7/1976 | Sperley | 524/94 |
| 4,524,174 | 6/1985 | Watson | 524/572 |
| 4,742,164 | 5/1988 | Iguchi et al. | 435/823 |
| 4,745,150 | 5/1988 | Ida et al. | 524/572 |

OTHER PUBLICATIONS

Cellulon Fiber Specifications by Weyerhauser 1990.

*Primary Examiner*—Paul R. Michl
*Assistant Examiner*—La Vonda DeWitt
*Attorney, Agent, or Firm*—David E. Wheeler

[57] ABSTRACT

Reinforced elastomeric articles, such as tires, wherein the reinforcement is reticulated bacterial cellulose are provided. Reticulated bacterial cellulose has an average diameter of about 0.1 micron and a substantially infinite aspect ratio. The reinforced article comprises about 2 phr to 10 phr of the cellulose reinforcement.

5 Claims, 5 Drawing Sheets

18,000 X 18,000 X

690 Å/mm

RETICULATED BACTERIAL CELLULOSE REINFORCEMENT FOR ELASTOMERS

BACKGROUND OF THE INVENTION

The invention relates to reinforced elastomeric articles, especially tires, wherein the reinforcement comprises reticulated bacterial cellulose.

It is well known in the art that fiber reinforced elastomer composites have a higher modulus and better cut and tear growth properties than the corresponding reinforcement free elastomer. Although a higher modulus and better cut and tear growth properties are desirable properties, a short fiber reinforced elastomer often has reduced tensile properties and reduced elongation properties. It is often the case that the amount of fiber loading in a reinforced elastomer is a trade off between the modulus, cut growth and tear growth properties desired, and the reduction in tensile properties and elongation that can be tolerated.

It is an object of the present invention to provide an elastomeric article that has improved modulus, tear growth and cut growth properties while having substantially undiminished tensile and elongation properties.

Other objects of the invention will be apparent from the following description and claims.

SUMMARY OF THE INVENTION

A reinforced elastomeric article is provided which has tensile properties and elongation properties substantially equivalent to the unreinforced elastomer, and a modulus 25% to 400% greater than the same elastomer without fiber reinforcement.

The article comprises an elastomeric matrix which has incorporated therein a reinforcing amount of reticulated bacterial cellulose fiber.

In the illustrated embodiment, the fiber has an average diameter of about 0.1 micron and a substantially infinite aspect ratio. The fiber may comprise about 2 phr to 15 phr by weight of the article.

Also provided is a pneumatic tire in which one or more of its components are a reticulated bacterial cellulose fiber reinforced elastomer.

DETAILED DESCRIPTION OF THE INVENTION

For good short fiber reinforcement of elastomers, two important criteria are good adhesion between the fiber and the elastomer and a high fiber aspect ratio. To achieve a high aspect ratio, one can either increase the length of the fiber or reduce the diameter of the fiber.

It is well known in the art that cellulose fibers exhibit excellent adhesion to elastomers.

Figure 1:
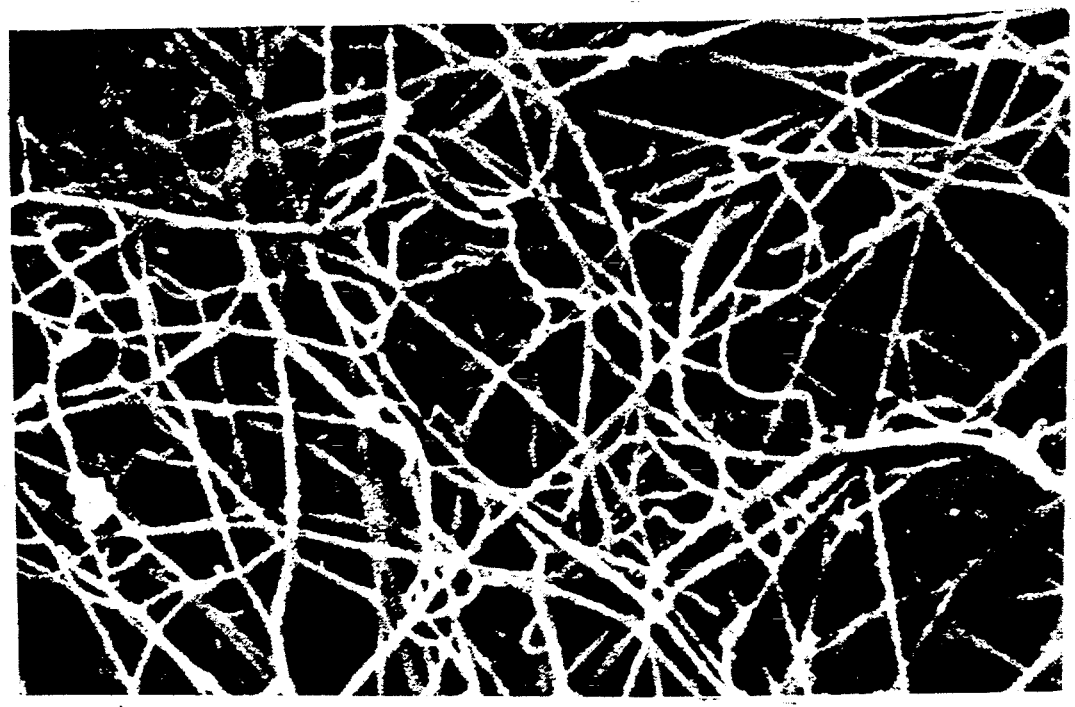
FIG. 1 illustrates reticulated bacterial cellulose fiber.

With reference now to FIG. 1, an illustrated reticulated bacterial cellulose fiber is produced by Acetobacter bacteria in an aerated, agitated culture. Such a fiber known by the trade name Cellulon ® is available from Weyerhauser. The illustrated fiber has an average diameter of about 0.1 micron, and the fiber is interconnected and networked such that the aspect ratio is incalculable and, for purposes of this description, is considered to be substantially infinite.

The Cellulon ® fiber submicron diameter is about 1/100 the diameter of conventional cellulose fibers such as cotton.

Cellulon ® fiber is supplied in an aqueous medium containing about 15% to 30% solids by weight. It has been found that the fibers can most efficiently be incorporated in an elastomer by introducing the fiber containing medium into a latex or an elastomer cement.

If a latex is used, the latex may be coagulated as is conventional in the art. If desired, the resulting fiber containing elastomer can be used as a masterbatch and mixed with natural rubber or other elastomer suitable for its intended purpose.

Figure 2:
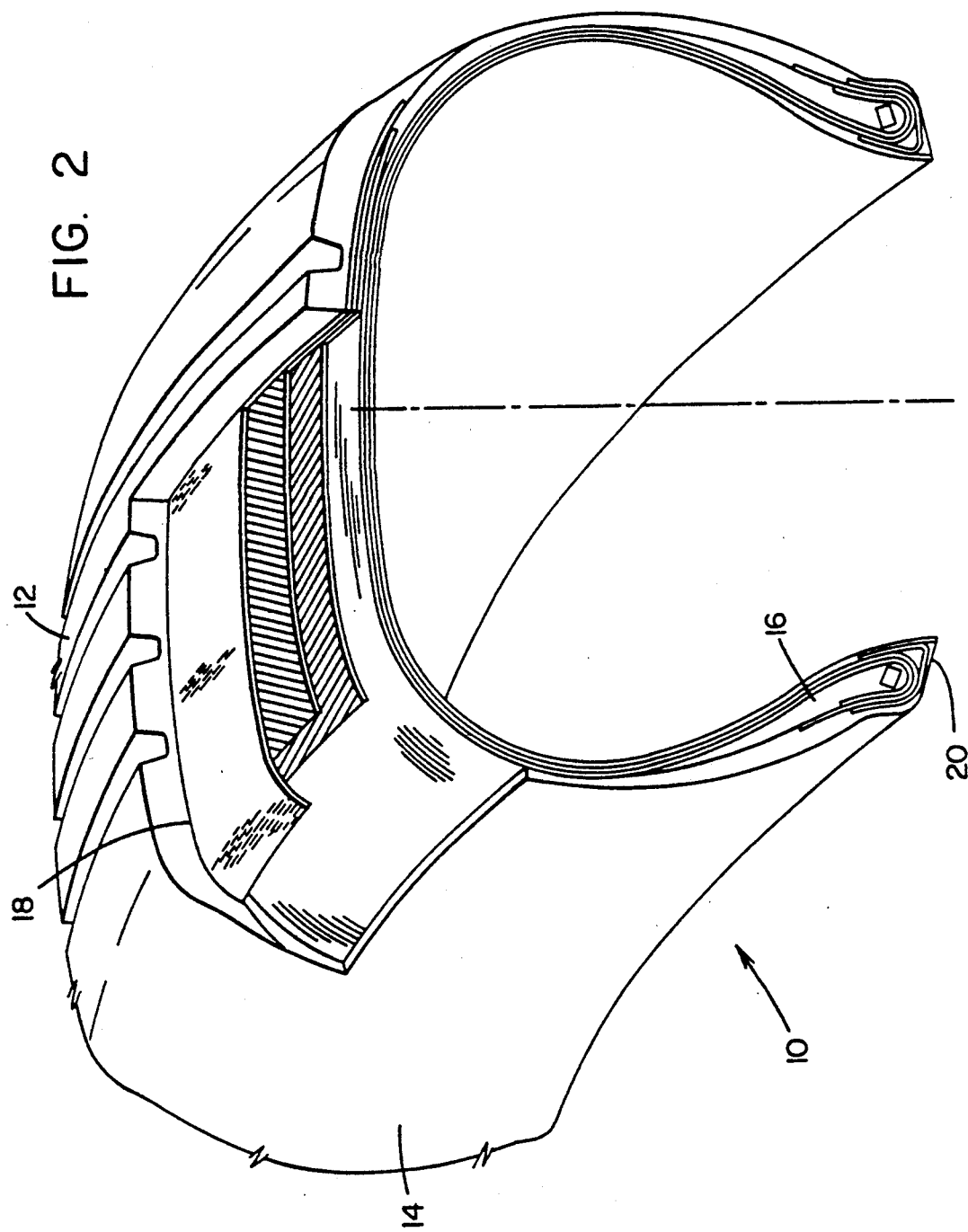
FIG. 2 illustrates a cellulose fiber reinforced pneumatic tire.

With reference now to FIG. 2, it is believed that the reticulated bacterial cellulose fiber can be used in practically any tire component, alone or together with other reinforcement (including other fibrous reinforcement), where tire properties can be improved by fiber reinforcement. The reticulated bacterial cellulose fiber may comprise 2 phr to 15 phr, preferably 2 phr to 10 phr of the elastomer composite. phr represents parts by weight per one hundred parts by weight rubber.

In the tread 12 of tire 10 for example, the reticulated bacterial cellulose fiber reinforcement is believed to provide a greater tread modulus (which improves tread wear and rolling resistance) while the tensile properties (and the traction) remain undiminished. Similarly, in the sidewall 14 the fibers provide better penetration resistance and crack growth properties while the flexibility of the sidewall is not diminished as compared to the sidewall compound without fiber reinforcement.

Figure 2A:
FIG. 2a illustrates cellulose fibers dispersed in an SBR elastomer matrix.

FIG. 2a illustrates an SBR/Cellulon ® composite. SBR (styrene butadiene rubber), with specific modifications, can be used in the tread of a tire or in a tire sidewall. Similar results are believed possible in apex 16, treadbase 18, and toe guard 20. Other uses of fiber reinforcement in a tire will be apparent to those skilled in the art.

The invention is further illustrated with reference to the following examples.

EXAMPLE 1

Cellulon ® fiber is supplied in an aqueous system containing about 15–30% solids (by weight). The fibers can be dispersed either in elastomer cement or latex during elastomer production.

6.25 g of Cellulon ® product (17 wt. % fiber) was blended with 250 g of (21% SBR) Plioflex 1502 latex in a Waring Blender for 2 minutes. Plioflex 1502 comprises a styrene butadiene co-polymer containing 23.5% styrene. The mixture was coagulated with a typical coagulating agent (900 g of water, 30 g of NaCl, 1.8 g of Conc. $H_2SO_4$, and 7.5 g of a liquid cationic amine) at 70° C. The coagulated elastomer fiber mixture was washed twice with 2000 cc of water. The prepared sample contained 2 phr fiber. The resulting sample, designated 1b, was mixed into a testing compound having the following formulation. The compound was subsequently cured and tested.

In the examples herein, the material specific to an example is designated 1b in the following formula. Unless otherwise specified, all the examples are the same except for the different 1b materials specified.

|    | Ingredient | Type | Amount in phr |
|----|------------|------|---------------|
| 1. | (a) cis,1,4-polyisoprene | elastomer | 25 |
|    | (b) material in examples | elastomer | 75 |
| 2. | carbon black, general purpose tread | filler | 45 |
| 3. | petroleum process oil | plasticizer | 9 |
| 4. | N-phenyl-N'-(1,3 dimethyl/butyl) N-phenyl-P-phenylenediamine | antidegradant | 2 |
| 5. | mixed diaryl-P-phenylene diamine | antidegradant | 1 |
| 6. | paraffinic/micro crystalline wax | processing aid | 1 |
| 7. | stearic acid | activator | 3 |

Brabender Mixer Compounding.

The Cellulon ® fibers were on top of the 100 parts of elastomer as described in the ingredients.

A Brabender mix at 70 rpm using a 120° C. oil bath, was used for non productives (ingredients 1-7). Mix time as 5 minutes, and the drop temperature was approximately 270° F.

The non-productive mixes were used for further compounding by reloading the non-productives in the mixer and adding the following ingredients:

|    |                         |             |     |
|----|-------------------------|-------------|-----|
| 8. | Sulfur | curative | 1.6 |
| 9. | N, N' diphenyl guanidine | accelerator | 0.4 |
| 10. | 2 (morpholino-thio) benzenethiazole | accelerator | 0.8 |
| 11. | Zinc oxide | accelerator | 3 |

Productive mixes (non-productive plus the accelerators and vulcanizing agents, (ingredients 8-11) were carried out without external heating at 50 rpm for 3 minutes. The compounded elastomers were cured at 150° C. The vulcanizate physical properties of the reinforced elastomer were compared to that of a control compound comprising the above formulation prepared without the addition of a fiber reinforcement.

EXAMPLE 2

The procedure of Example 1 was repeated using 12.5 g Cellulon ® fibers in material 1 (b), and the resultant sample had a fiber content of 2.9 phr.

EXAMPLE 3

The procedure of Example 1 was repeated using 25 g Cellulon ® product (17 wt % fiber) in material 1(b), and the resultant sample contained 5.6 phr fiber reinforcement.

EXAMPLE 4

90 g of 62 wt % of natural rubber latex was mixed with 100 g of water and 14 g of 16 wt % Cellulon ® product in a Waring blender for 2 minutes. The mixture was coagulated in 800 g of isopropanol and dried. 75 phr of the natural rubber fiber composite, material 1(b), was used in the formulation described in Example 1. The resultant sample had a fiber content of 2.9 phr.

The comparative results of tensile properties are listed below. Control 1 is a rubber sample of the formula illustrated in Example 1 (polyisoprene/SBR) without fiber reinforcement. Control 2 is a blend of 75 phr natural rubber and 25 phr cis 1, 4 polyisoprene.

TABLE I

| Sample | Moduli @ 50% | (psi) 100% | 300% | Tensile PSI | Elongation % | T90 (min) |
|--------|------|------|------|---------|----------|-------|
| Control 1 | 131 | 184 | 301 | 3318 | 1143 | 23.5 |
| Example 1 | 207 | 279 | 416 | 3293 | 1150 | 22.5 |
| Example 2 | 294 | 390 | 555 | 3193 | 1074 | 21.0 |
| Example 3 | 357 | 474 | 679 | 2906 | 940 | 21.5 |
| Control 2 | 147 | 238 | 825 | 3446 | 837 | 9.7 |
| Example 4 | 286 | 496 | 1300 | 3580 | 741 | 9.7 |

Autovibron was run with a frequency of 11 Hz.

The data shows that the modulus increases with increased fiber loading while the tensile properties and elongation properties are relatively stable.

The cure rheometer data (Table 1) showed Cellulon ® fiber does not alter the curing characteristics of SBR. T90 values of samples containing various amounts of Cellulon ® fiber are similar to the SBR control.

Tensile values show that the modulus value is proportional to the concentration of Cellulon ® fiber in Plioflex 1502. There is very little reduction in breaking tensile and elongation at a Cellulon ® fiber concentration below four percent by weight.

Tensile values in Table 1 also show the effectiveness of Cellulon ® in natural rubber latex. At 2.9 phr loading there are 94% and 108% improvements of moduli at 50% and 100% elongation respectively. There is no loss in ultimate tensile strength.

The properties of the composite of this invention are compared with composites made with other types of fibers in Table 2.

TABLE 2

| COMPARISON OF ELASTOMER REINFORCED WITH VARIOUS FIBERS (3.3 PHR FIBER) | | | | |
|--------|--------|--------|--------|--------|
| Sample | Plioflex 1502 Control | Kevlar ® PULP | Cellulon ® | Santoweb ® |
| Tensile, psi | 3669 | 3012 | 3663 | 2988 |
| Elg. % | 639 | 521 | 623 | 574 |
| Mod. psi @ | | | | |
| 50% | 169 | 455 | 297 | 286 |
| 100% | 254 | 658 | 479 | 376 |
| 300% | 1194 | 1434 | 1450 | 1200 |
| DeMattia* | 0.0231 | 0.0511 | 0.0209 | 0.0380 |

*Demattia Flex (pierced) @ 200 F. cut growth rate (in/Kc) from 0.20 to 0.70 inch.
Kevlar ® fiber diameter 20 micron from DuPont
Cellulon ® fiber diameter 0.1 micron
Santoweb ® material is ribbon like with two axes = 16 & 18 micron.

Results in Table 2 indicate a Cellulon ® reinforced composite has an excellent modulus modified at low strain. Cellulon ® reinforcement is not as effective as Kevlar ® pulp, but at high strain the difference diminishes. This may be due to the debonding of Kevlar ® from the elastomer. The lower break tensile strength of Plioflex 1502-Kevlar ® as compared to the control and Plioflex 1502. Santoweb ® and Plioflex 1502/Cellulon ® could also be due to debonding of Kevlar ®. Both Cellulon ® and Santoweb ® are cellulose fibers. Santoweb ® is a Monsanto product. It is based on unregenerated cellulose fiber with a surface treatment for better adhesion to elastomer.

Results in Table 2 showed that Cellulon ® fiber is a more effective reinforcement than Santoweb ® in terms of tensile strength and tensile modulus.

Demattia Flex test results gave some indication that the Plioflex 1502-Cellulon ® composite has better cut growth resistance than the control and the other two fiber reinforced composites. This can be attributed to the small diameter and high aspect ratio of Cellulon ® fibers.

The Kevlar ® and Santoweb ® reinforced composites did not have good cut growth resistance, perhaps due to the large fiber diameter.

Figure 3:
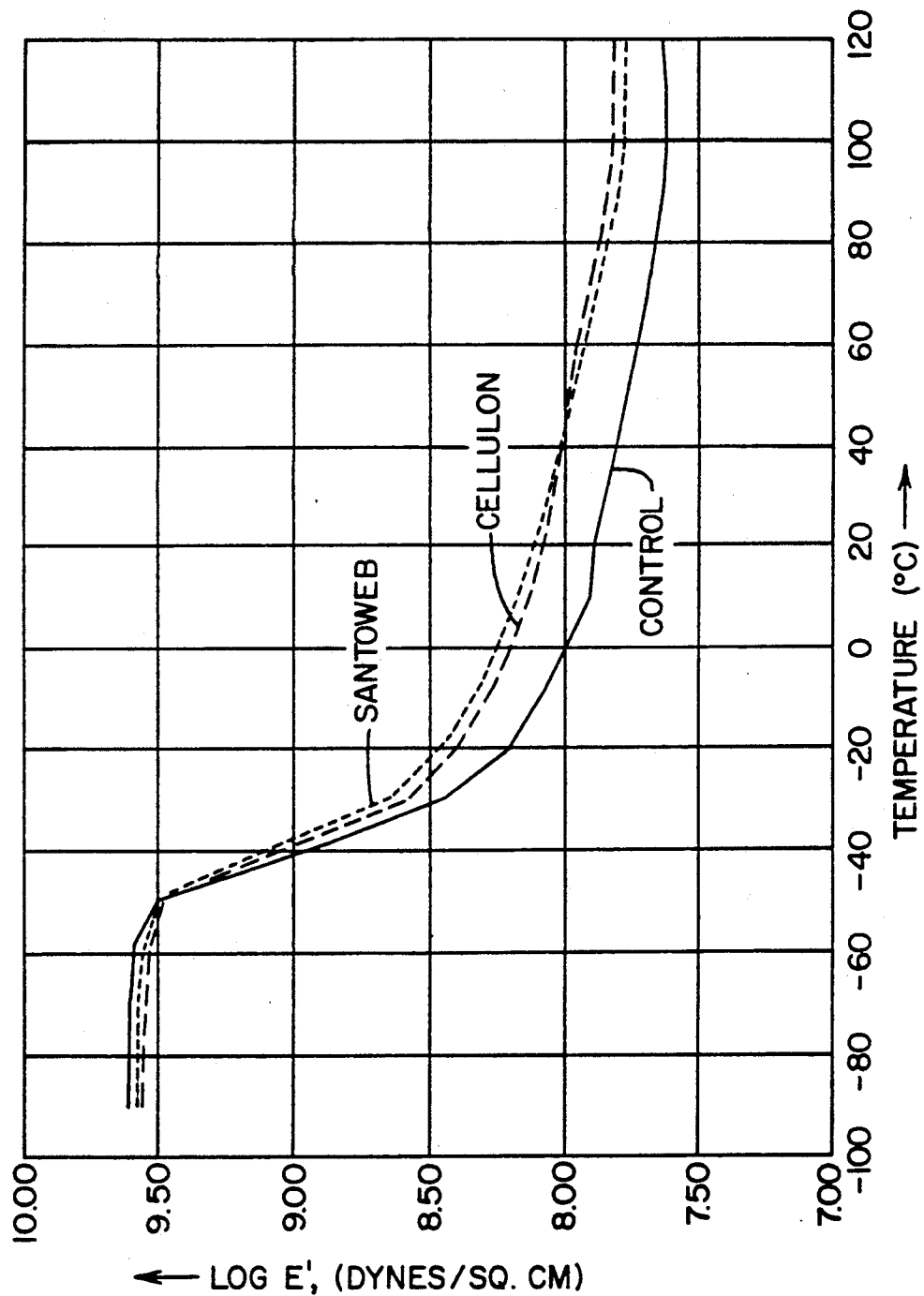
FIG. 3 illustrates the storage modulus of the reinforced composite of the invention as compared with unreinforced elastomer and a prior art composite.

FIG. 3 shows that the storage modulus of samples containing 4% Cellulon ® fiber and Santoweb ® are higher than the storage modulus of the control throughout the temperature range (−40° to 120° C.). Cellulon ® fiber and Santoweb ® showed similar effectiveness in improving the storage modulus of the final composite.

Tan Deltas of all three samples (FIG. 4) are quite similar in the range between 20° and 80° C. These samples containing fibrous reinforcement have a tan delta slightly higher than the control between 80° and 120° C., but all of them are below 0.12.

In Summary, low concentrations of Cellulon ® fibers increase the tensile modulus of SBR elastomer composites without sacrificing ultimate tensile and elongation. Cellulon ® fibers improve the tensile modulus of natural rubber composites without reducing the tensile at break.

Figure 4:
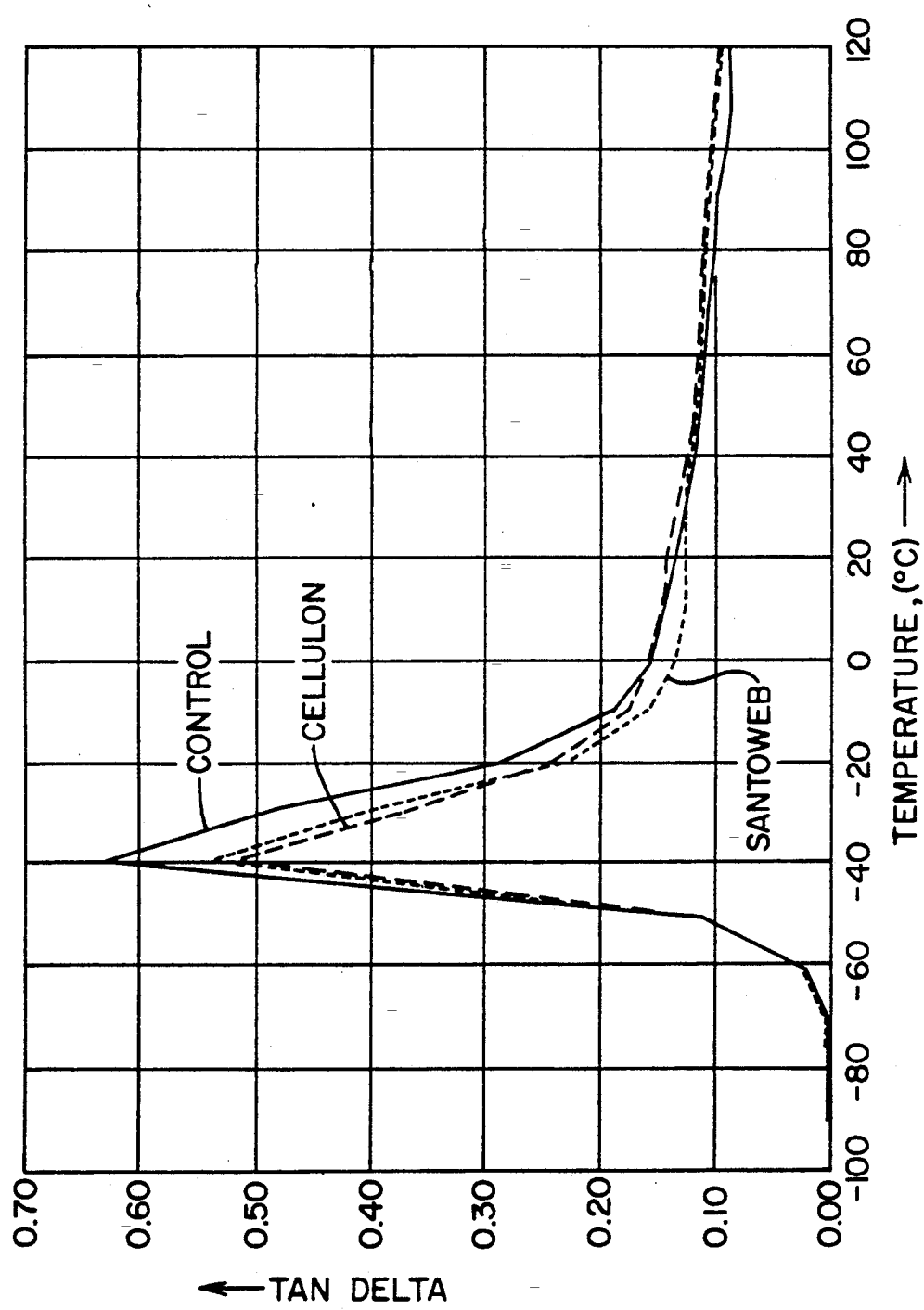
FIG. 4 illustrates the tan delta for the same composites compared in FIG. 3.

Cellulon ® fiber reinforced SBR has a similar Tan Delta scan to a composite reinforced with Santoweb ®, FIG. 4. It has a higher storage modulus than an SBR control in the temperature range (−40° to 120° C.). Cellulon ® fiber reinforced SBR shows improved cut growth resistance.

While specific embodiments of the invention have been illustrated and described, it will be apparent to those skilled in the art that the invention may be variously modified and practiced without departing from the spirit of the invention. The invention is limited only by the scope of the following claims.

What is claimed is:

1. A reinforced elastomeric article which has tensile properties and elongation properties substantially equivalent to the elastomer without fiber reinforcement, and a tensile modulos 25% to 400% greater than said elastomer wherein the elastomeric article comprises an elastomeric matrix having distributed therein a reinforcing amount of reticulated bacterial cellulose fiber wherein said fiber has an average diameter of about 0.1 micron.

2. The article of claim 1 which comprises about 2 phr to 15 phr reticulated bacterial cellulose fiber.

3. A pneumatic tire containing a fiber reinforced elastomer component wherein said component comprises an elastomeric matrix having distributed therein a reinforcing amount of reticulated bacterial cellulose fiber wherein said fiber has an average diameter of about 0.1 micon.

4. The tire of claim 3 which comprises about 2 phr to 20 phr reticulated bacterial cellulose fiber.

5. A method of reinforcing an elastomeric article comprising the steps of:
   (a) preparing and mixing an elastomer to be used in a reinforced elastomeric article, and
   (b) adding 2 to 20 phr reticulated bacterial cellulose fiber having an average diameter of 0.1 micron to said elastomer during mixing.

* * * * *